US012809680B2

(12) United States Patent
Qunaibi et al.

(10) Patent No.: US 12,809,680 B2
(45) Date of Patent: Nov. 24, 2026

(54) SYSTEMS AND METHODS FOR CONNECTIVTY-AWARE SCHEDULING

(71) Applicant: Acronis International GmbH, Schaffhausen (CH)

(72) Inventors: Sara Qunaibi, Waterloo (CA); Sreeharsha Udayashankar, Waterloo (CA); Samer Al-Kiswany, Waterloo (CA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 606 days.

(21) Appl. No.: 18/449,011

(22) Filed: Aug. 14, 2023

(65) Prior Publication Data

US 2025/0061001 A1 Feb. 20, 2025

(51) Int. Cl.
*G06F 9/50* (2006.01)

(52) U.S. Cl.
CPC .................................. *G06F 9/5027* (2013.01)

(58) Field of Classification Search
CPC ..................................................... G06F 9/5027
See application file for complete search history.

(56) References Cited

U.S. PATENT DOCUMENTS 9,749,174 B1 * 8/2017 Goff .................... H04L 67/1004
10,346,189 B2 * 7/2019 Chen ................... G06F 9/45545
2018/0123943 A1 * 5/2018 Lee ......................... H04L 45/28
2019/0278938 A1 * 9/2019 Greene ................... H04L 41/40
2024/0069979 A1 * 2/2024 Sakthivel .............. G06F 9/5072

* cited by examiner

*Primary Examiner* — Michael W Ayers
(74) *Attorney, Agent, or Firm* — ArentFox Schiff LLP; Michael Fainberg

(57) ABSTRACT

Disclosed herein are systems and method for connectivity-aware scheduling. A method may receive connection information that indicates interconnections between a plurality of nodes in a cluster, and may generate a connectivity matrix based on the connection information. The method may identify a first computing unit and a second computing unit associated with an application, schedule the first computing unit onto a first node of the cluster, and subsequent to scheduling the first computing unit onto the first node, schedule the second computing unit onto a second node of the cluster instead of a third node of the cluster in response to determining that the first computing unit and the second computing unit belong to a same application and that the first node is connected to the second node according to the connectivity matrix.

17 Claims, 3 Drawing Sheets

100

SYSTEMS AND METHODS FOR CONNECTIVTY-AWARE SCHEDULING

FIELD OF TECHNOLOGY

The present disclosure relates to the field of data networks, and, more specifically, to systems and methods for connectivity-aware scheduling.

BACKGROUND

Network schedulers assign tasks to nodes that are partitioned from the cluster. Conventional network schedulers are not adequate at handling partial network partitions, which are network failures that disrupt the communication between some nodes in a cluster. In a partial partition, at least one node will not be able to communicate with a subset of the cluster nodes. If a node cannot communicate with another node, it will declare that node as failed. Partial partitions lead to a confusing state in which some nodes report others as failed and start executing recovery procedure, while the rest of the cluster does not see a failure. Due to the lack of communication, partial network partitions cause programs to halt or fail to execute. This ultimately leads to significant performance degradation.

SUMMARY

In one exemplary aspect, the techniques described herein relate to a method for connectivity-aware scheduling, the method including: receiving connection information that indicates interconnections between a plurality of nodes in a cluster; generating a connectivity matrix based on the connection information, wherein the connectivity matrix indicates that, in the plurality of nodes, a first node is connected to a second node and is not connected to a third node; identifying a first computing unit and a second computing unit associated with an application; scheduling the first computing unit onto the first node; subsequent to scheduling the first computing unit onto the first node, scheduling the second computing unit onto the second node instead of the third node in response to determining that the first computing unit and the second computing unit belong to a same application and that the first node, onto which the first computing unit is scheduled, is connected to the second node according to the connectivity matrix.

In some aspects, the techniques described herein relate to a method, further including: storing scheduler metadata that indicates that the first computing unit is scheduled onto the first node; and determining where the first computing unit is scheduled using the scheduler metadata when scheduling the second computing unit.

In some aspects, the techniques described herein relate to a method, wherein scheduling the second computing unit to the second node further includes determining that the second node is available for computation.

In some aspects, the techniques described herein relate to a method, wherein scheduling the first computing unit onto the first node is in response to determining, based on the connectivity matrix, that the first node is a fully connected node.

In some aspects, the techniques described herein relate to a method, wherein a fourth node of the plurality of nodes is a fully connected node, and wherein the first node is connected to a second most amount of nodes in the plurality of nodes, further including: scheduling the first computing unit onto the first node in response to determining that the fourth node is unavailable for receiving assignments.

In some aspects, the techniques described herein relate to a method, further including monitoring for changes in the interconnections using a link state protocol; and updating the connectivity matrix in response to detecting the changes.

In some aspects, the techniques described herein relate to a method, wherein receiving the connection information includes: receiving individual connection information from each node of the plurality of nodes; and combining the individual connection information to form the connection information.

In some aspects, the techniques described herein relate to a method, further including: in response to determining that the second node is unavailable for receiving assignments and determining that the first node is available to receive additional assignments, scheduling the second computing unit onto the first node.

It should be noted that the methods described above may be implemented in a system comprising a hardware processor. Alternatively, the methods may be implemented using computer executable instructions of a non-transitory computer readable medium.

In some aspects, the techniques described herein relate to a system for connectivity-aware scheduling, including: at least one memory; at least one hardware processor coupled with the at least one memory and configured, individually or in combination, to: receive connection information that indicates interconnections between a plurality of nodes in a cluster; generate a connectivity matrix based on the connection information, wherein the connectivity matrix indicates that, in the plurality of nodes, a first node is connected to a second node and is not connected to a third node; identify a first computing unit and a second computing unit associated with an application; schedule the first computing unit onto the first node; subsequent to scheduling the first computing unit onto the first node, schedule the second computing unit onto the second node instead of the third node in response to determining that the first computing unit and the second computing unit belong to a same application and that the first node, onto which the first computing unit is scheduled, is connected to the second node according to the connectivity matrix.

In some aspects, the techniques described herein relate to a non-transitory computer readable medium storing thereon computer executable instructions for connectivity-aware scheduling, including instructions for: receiving connection information that indicates interconnections between a plurality of nodes in a cluster; generating a connectivity matrix based on the connection information, wherein the connectivity matrix indicates that, in the plurality of nodes, a first node is connected to a second node and is not connected to a third node; identifying a first computing unit and a second computing unit associated with an application; scheduling the first computing unit onto the first node; subsequent to scheduling the first computing unit onto the first node, scheduling the second computing unit onto the second node instead of the third node in response to determining that the first computing unit and the second computing unit belong to a same application and that the first node, onto which the first computing unit is scheduled, is connected to the second node according to the connectivity matrix.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for connectivity-aware scheduling. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Conventional schedulers fail to take into account the connectivity of the cluster when making scheduling decisions. Connectivity aware scheduling is a scheduling algorithm described in the present disclosure that addresses this shortcoming.

Figure 1:
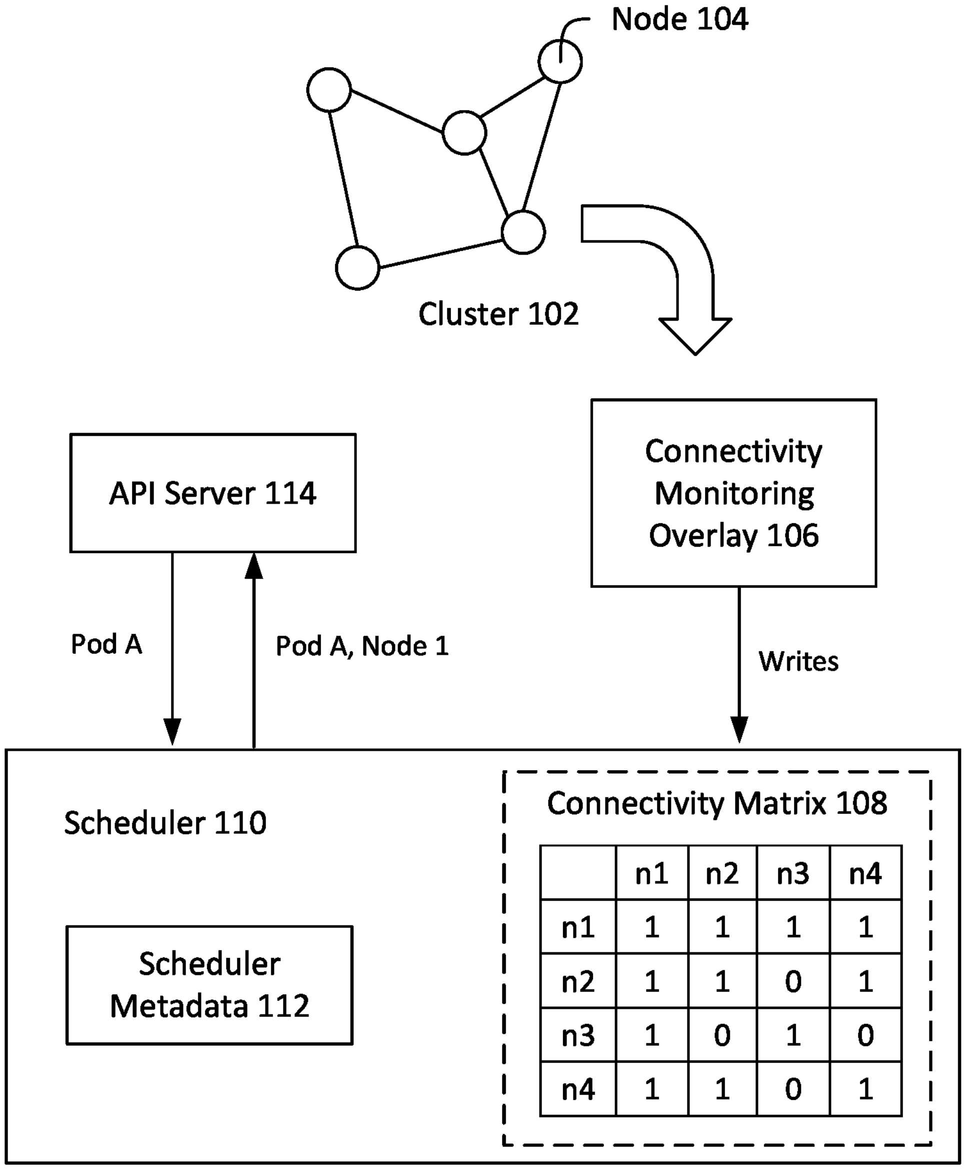
FIG. 1 is a block diagram illustrating a system for connectivity-aware scheduling.

FIG. 1 is a block diagram illustrating system 100 for connectivity-aware scheduling. System 100 includes cluster 102, which is made up of a plurality of nodes 104. For example, each node may be a computer system 20 described in FIG. 3. Connectivity monitoring overlay 106 monitors the connectivity of cluster 102. For example, if cluster 102 includes a plurality of nodes 104 (e.g., nodes 1, 2, 3, 4, etc.), connectivity monitoring overlay 106 tracks the connections of each node (e.g., node 1 is connected to node 2, node 2 is not connected to node 3, etc.). In some aspects, connectivity monitoring overlay 106 is a daemon that runs on each node 104 in cluster 102. For example, a first node may ping the other nodes in cluster 102 may identify the nodes that responded. Each connectivity monitoring overlay 106 may share this information and generate a connectivity matrix, which identifies all of the nodes in cluster 102 and indicates whether a connection exists or does not exist between each node.

For example, in FIG. 1, connectivity matrix 108 identifies four nodes. Each node is assigned a row and a column. If two nodes have a connection, connectivity matrix 108 has a "1" in the intersecting block of the nodes' row/column and if two nodes do not have a connection, connectivity matrix 108 has "0" in the intersecting block. In FIG. 1, nodes 2 and 3 do not have a connection, which is signified by a "0."

In some aspects, connectivity monitoring overlay 106 on each node broadcasts the individual connections of a node. For example, node 2 is connected to all nodes except node 3. Connectivity monitoring overlay 106 may exchange its connection information with nodes 1, 2, and 4. In some aspects, node 2 may be unaware of the existence of node 3 until receiving connection information from a node that is connected to node 3. For example, node 2 may receive connection information including an identifier (e.g., a MAC address, IP address, etc.) of node 3 from node 1, which is connected to node 3. Connectivity monitoring overlay 106 may then start building connectivity matrix 108 by generating rows and columns for each known unique node in cluster 102 and populating the connection information. In this case, node 2 will include a column/row for node 3, and enter a "0" for the intersection between node 2 and node 3 (because they are not connected) and enter a "1" for the intersection between node 1 and node 3 (because they are connected).

In some aspects, node 2 may not receive the connection information directly from node 3. However, because node 3 is connected to various nodes that are connected to node 2, those nodes may forward the connection information of node 3 to node 2. In other words, the only prerequisite for receiving the connection information of a given node is that the given node must be part of the same cluster.

In some aspects, each of the nodes may also exchange each individual connectivity matrix and combine the individual connectivity matrices to form connectivity matrix 108. Suppose that a given node is connected to all nodes in a cluster. The individual connectivity matrix generated by the given node may be the most accurate because the given node receives connection information from all other nodes and knows which nodes are interconnected. However, suppose that a given node is only connected to a small group of nodes, which are connected to other nodes in the cluster. The individual connectivity matrix of the given node will be incomplete because the given node is not connected to said other nodes in the cluster. However, by combining the individual connectivity matrix with other received connectivity matrices from the small group of nodes, the updated connectivity matrix (with the combined individual connectivity matrices) of the given node may be improved. When combining individual matrices, the individual connectivity monitoring overlays may verify connection information by cross-checking the data in each individual matrix to ensure they coincide.

In some aspects, the given node may broadcast the updated connectivity matrix and receive the updated connectivity matrices from the small group of nodes. Because those received updated connectivity matrices include information from said other nodes in the cluster, after a few updates and broadcasts, each node can generate a complete connectivity matrix. When the received connectivity matrix matches a broadcasted connectivity matrix, the given node may confirm that the connectivity matrix is complete. In some aspects, the connectivity matrix is periodically updated and broadcasted. Accordingly, when a new node is added to the cluster or is removed from the cluster, the connectivity matrix remains accurate.

In some aspects, connectivity monitoring overlay 106 uses a link state protocol to build and update any changes that happen to the connectivity matrix 108. The update may include adding or removing connections to the matrix 108.

Scheduler 110 takes information from scheduler metadata 112 and the connectivity monitoring overlays (specifically connectivity matrix 108) to make an informed decision on where a pod should be scheduled. Pods are deployable units of computing used by scheduler 110. In some aspects, a pod may include one or more containers, with shared storage and network resources, and a specification for how to run the containers. In some aspects, scheduler 110 is a Kubernetes scheduler.

Multiple pods may belong to a single application and may be scheduled to different nodes in cluster 102. Scheduler metadata 112 keeps track, using application identifiers (e.g., a combination of characters such as "app123"), of where previous pods belonging to the same application have been scheduled. For example, consider a Spark Java word count application that runs on multiple nodes. The application IDs may be spark-java-wordcount-12345-1, spark-java-wordcount-12345-2, spark-java-wordcount-12345-3. In some aspects, the metadata may additionally include information about the application such as: application status, how many restarts the application has had, application age, where the application is running (on which node) and the IP address of the application.

Suppose, in another example, that a first application has two pods (e.g., pod A and pod B) that need to be scheduled, and the pods are scheduled serially such that when pod A is initially scheduled onto node 1, scheduler 110 updates scheduler metadata 112. For example, scheduler metadata 112 may be a table with a plurality of entries indicating where pods are assigned and which application they belong to. An example entry may be:

| Timestamp | Application ID | Pod ID | Node ID |
|---|---|---|---|
| 12:11:11 Jan. 1, 2023 | App123 | A | 1 |

When it is time for pod B to be scheduled, scheduler 110 may query scheduler metadata 112, and determines that for the first application, pod A had been scheduled onto node 1.

If a pod is the first pod in an application (e.g., pod A of application app123), scheduler 110 may use connectivity matrix 108 to schedule the pod onto the most fully connected node (i.e., the node with the highest number of connections according to the connectivity matrix) that is available to receive assignments. For subsequent pod(s) in an application, scheduler 110 may take the information of where previous pod(s) of an application have been scheduled from scheduler metadata 112 and the connectivity matrix (from the daemons) to schedule the subsequent pod(s) onto a node that is connected to all node(s) housing the previous pod(s). Scheduler 110 may then update the scheduler metadata 112.

For example, referring to scheduler metadata 112, scheduler 110 may determine that pod A was scheduled onto node 1. Scheduler 110 may then determine which nodes are connected to node 1. In response to determining that node 2 is connected to node 1, scheduler 110 may schedule pod B of the same application onto node 2. Although this example is simplistic, the schedules grow more complicated as the number of nodes, pods, and applications increase.

For example, when assigning pod A, scheduler 110 may determine that the fully connected node (e.g., node 1) is not available to perform computations (e.g., node 1 may be down, busy, or undergoing maintenance). In this case, scheduler 110 may consider the next fully connected node or node with next highest amount of connections to assign pod A.

In another example, after pod A has been assigned to node 1, it is possible that the other nodes in cluster 102 are unavailable. Accordingly, identifying the next node in cluster 102 for scheduling pod B may be limited to available nodes that are connected to the node 1 or node 1 itself. For example, if node 1 has enough resources to run pod B, scheduler 110 may assign pod B to node 1.

In some aspects, scheduler 110 determines an amount of pods belonging to a particular application. Suppose that there are four pods for the first application. When scheduling the first pod, scheduler 110 may select a node that is connected to at least three other nodes. This allows for each pod to be scheduled on a node that is connected to another node with a scheduled pod of the application. If the first node is only connected to one other node, for example, the options to distribute the pods is limited. Scheduler 110 will not choose a node that is only connected to one other node unless the node is the most highly connected one in the cluster. Scheduler 110 is configured to prioritize the most fully connected node in a cluster in order to maximize the most amount of nodes that it can potentially connect to. For Example, when Pod A is being scheduled, scheduler 110 does not know how many pods will follow pod A. Scheduler 110 will assign pod A to an available node that is connected to the most nodes in the off chance that pod A is actually going to be connected to the maximum number of pods that an application can have. Scheduling is done serially and hence, when receiving pod A to schedule, scheduler 110 does not know how many pods will follow.

In one example, a first application may have two pods and a second application may have two pods as well. The first application and the second application may interact with one another. In response to determining that the first application and the second application interact, scheduler 110 may assign their respective pods to nodes that are connected to one another based on connectivity matrix 108.

Figure 2:
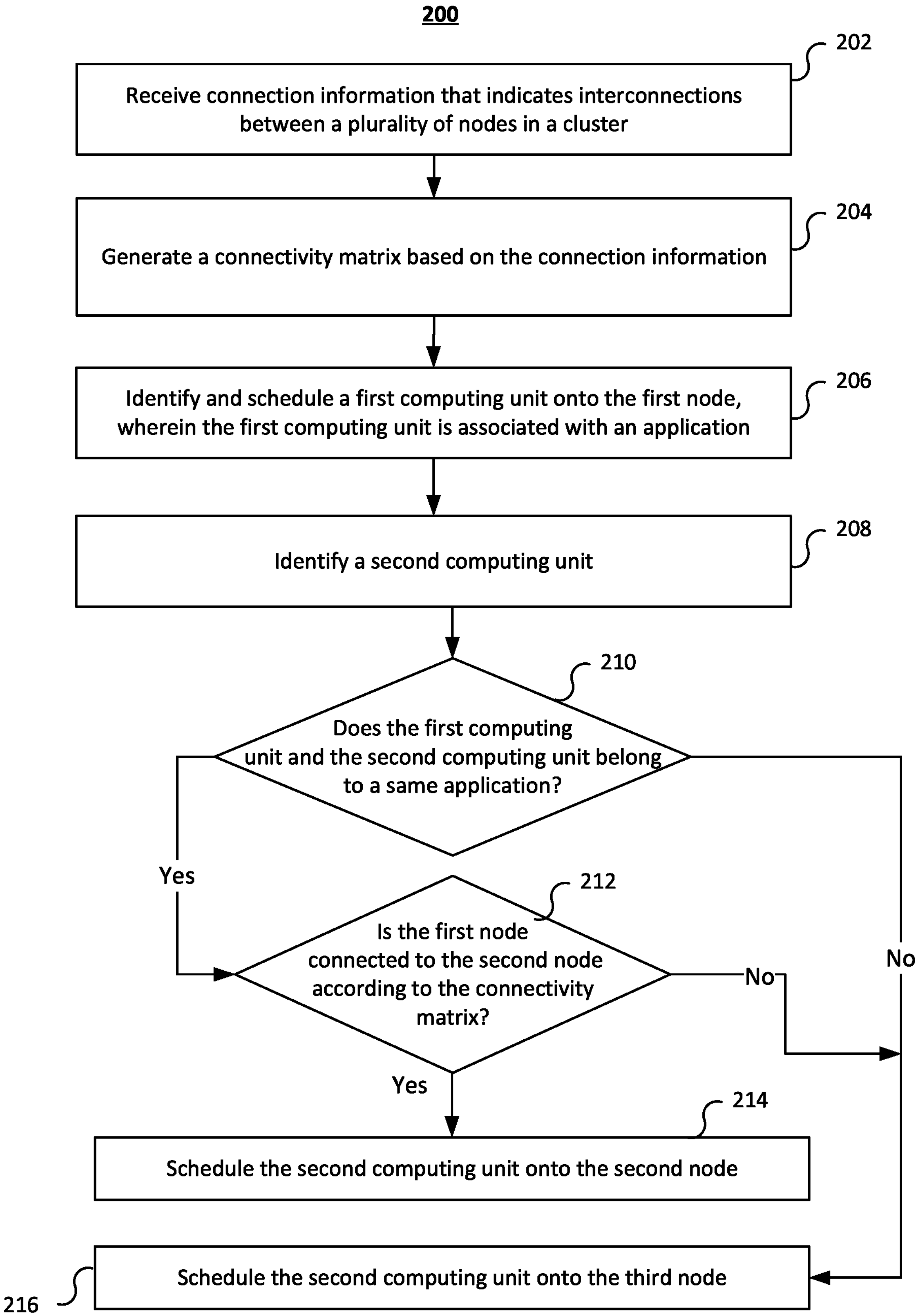
FIG. 2 illustrates a flow diagram of a method for connectivity-aware scheduling.

FIG. 2 illustrates a flow diagram of method 200 for connectivity-aware scheduling. At 202, scheduler 110 receives connection information that indicates interconnections between a plurality of nodes in a cluster. For example, the connection information may indicate whether a respective node is connected to another node in the cluster, but may not be organized for quick lookups. The connection information may be individual responses to broadcast messages that suggest that one node is able to communicate (i.e., is connected) to another node. In some aspects, scheduler 110 may receive individual connection information from each node of the plurality of nodes, and combine the individual connection information to form the connection information. For example, scheduler 110 may receive communication exchanges from all of the nodes in the cluster (rather than just one) and combine the information.

At 204, scheduler 110 generates a connectivity matrix based on the connection information. The connectivity matrix may be a two-dimensional vector with rows and columns. Each column and row may correspond to a certain node. As shown in connectivity matrix 108, if a connection between two nodes exists, a "1" is entered in the intersection of their row and column. This allows for quick lookups when scheduler 110 needs to determine which nodes should receive computing unit (e.g., pod) assignments. It should be noted that scheduler 110 may monitor for changes in the interconnections using a link state protocol and update the connectivity matrix in response to detecting any changes (e.g., nodes disconnecting, being removed, being added, etc.).

At 206, scheduler 110 identifies a first computing unit (e.g., a first pod) associated with an application and schedules the first computing unit onto the first node. In some aspects, when scheduling a computing unit onto a node, scheduler 110 may store scheduler metadata that indicates that the first computing unit is scheduled onto the first node. For example, the scheduler metadata may include an application identifier, a timestamp, and a pod identifier, and a node identifier. The application identifier and pod identifier may be extracted from the first computing unit. The scheduler metadata may thus be used at a later time to determine where the first computing unit was scheduled.

At 208, scheduler 110 identifies a second computing unit (e.g., a second pod). It should be noted that each of the pods may be evaluated individually. For example, each computing unit that is to be scheduled may be in a queue (e.g., first-in-first-out) evaluated by scheduler 110.

At 210, scheduler 110 determines whether the first computing unit and the second computing unit belong to a same application. For example, scheduler 110 may determine an application identifier associated with the second computing unit and determine, based on the scheduler metadata, that both computing units share an application identifier.

If they both belong to the same application, scheduler 110 attempts to maintain consistency in assignments by assigning the computing units of an application to nodes connected to one another. Accordingly, at 212, scheduler 110 determines whether the first node is connected to a second node according to the connectivity matrix. For example, in connectivity matrix 108, node n3 (the first node in this example) is connected to node n1 (the second node in this example), but is not connected to node n2 (the third node in this example).

In response to determining that the first node is connected to the second node, and that both computing units belong to the same application, at 214, scheduler 110 schedules the second computing unit onto the second node instead of the third node.

If the computing units do not belong to the same application or the first node is not connected to the second node (but a third node, instead), scheduler 110 may schedule the second computing unit onto the third node at 216.

In some aspects, scheduler 110 further considers availability. For example, each node may have a limited amount of computational resources, and therefore a computing unit cannot be scheduled onto a node if it simply cannot execute the computing unit. Thus, at 214, scheduler 110 schedules the second computing unit to the second node in response to determining that the second node is available for computation. For example, the second node may provide periodic snapshots to scheduler 110 that indicates its bandwidth (e.g., CPU usage, memory usage, etc.). Scheduler 110 may convert this snapshot into an availability measure, which is a function of the bandwidth parameters. For example, the availability measure may be a percentage of free computational resources available at a given node.

In some aspects, scheduling the first computing unit onto the first node involves first determining whether the first node is a fully connected node. It is possible that no single node in a cluster may be connected to all other nodes in the cluster. In this case, the first node is selected for scheduling by scheduler 110 in response to determining that the first node is connected to the highest amount of nodes in the cluster.

Consider an example in which a fourth node of the plurality of nodes is a fully connected node (or at least has the highest amount of connections to other nodes in the cluster). Suppose that the first node is connected to a second most amount of nodes in the plurality of nodes. Scheduler 110 may schedule the first computing unit onto the first node at 206 in response to determining that the fourth node is unavailable for receiving assignments. For example, the fourth node may be disabled (e.g., rebooting, updating, etc.) or may not have additional bandwidth to execute the first computing unit.

In some aspects, scheduler 110 may determine, at 214, that the second node is unavailable for receiving assignments. In response to determining that the first node is available to receive additional assignments, scheduler 110 may schedule the second computing unit onto the first node.

Figure 3:
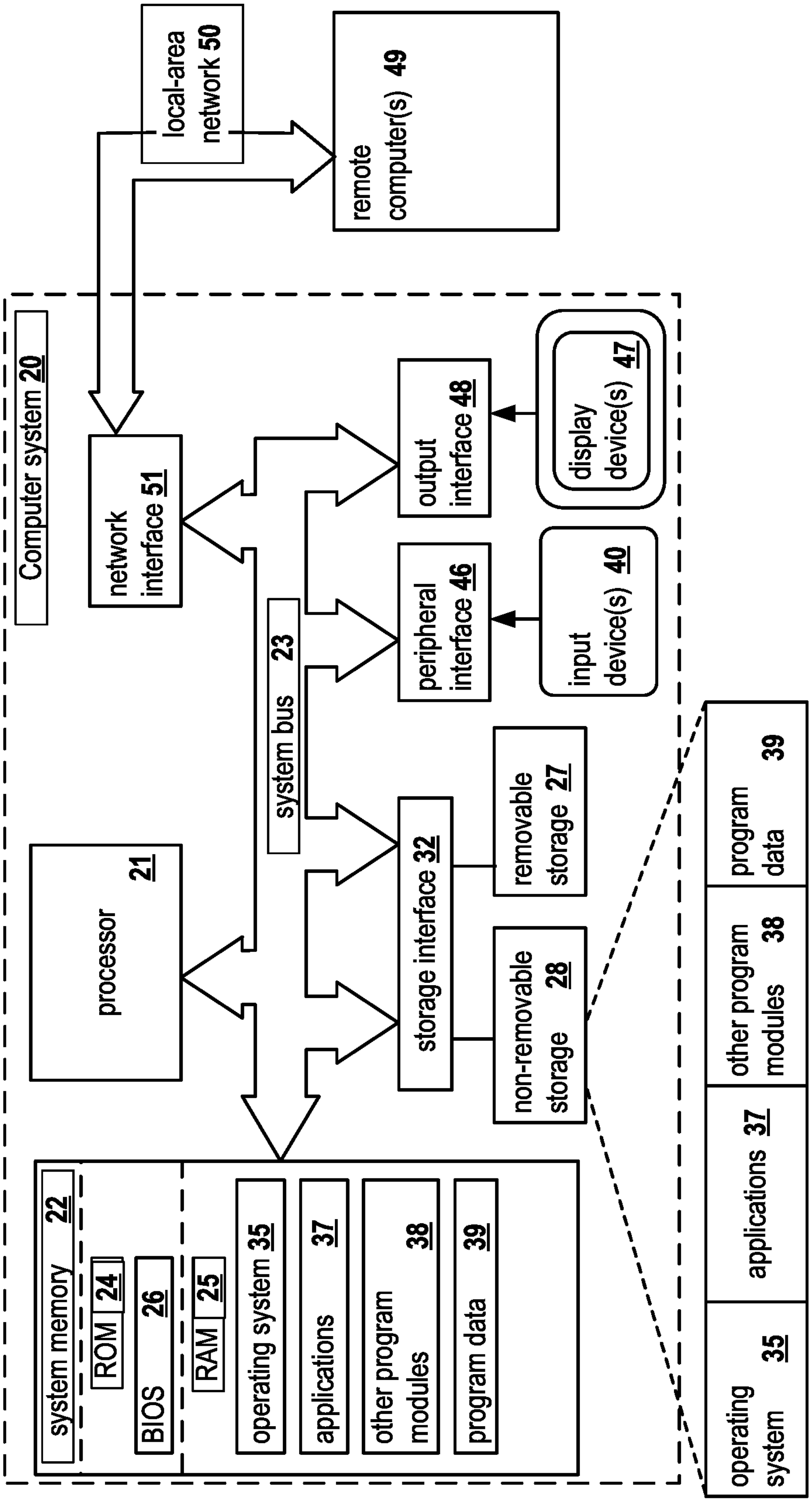
FIG. 3 presents an example of a general-purpose computer system on which aspects of the present disclosure can be implemented.

FIG. 3 is a block diagram illustrating a computer system 20 on which aspects of systems and methods for connectivity-aware scheduling may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for connectivity-aware scheduling, the method comprising:

executing, on each node of a plurality of nodes in a cluster, a connectivity monitoring overlay daemon that periodically pings other nodes in the cluster to determine connection status;

receiving, from the connectivity monitoring overlay daemon on each node, individual connection information indicating which other nodes in the cluster responded to the pings;

generating a connectivity matrix by combining the individual connection information received from each node, wherein the connectivity matrix is a two-dimensional data structure in which rows and columns correspond to nodes, and wherein values in the matrix indicate whether a connection exists or no connection exists between corresponding nodes, and wherein the connectivity matrix indicates that, in the plurality of nodes, a first node is connected to a second node and is not connected to a third node;

identifying a first computing unit and a second computing unit associated with an application, wherein the first computing unit and the second computing unit are pods comprising one or more containers with shared storage and network resources;

determining, based on the connectivity matrix, a number of nodes to which the first node is connected, and selecting the first node for scheduling the first computing unit in response to determining that the first node is connected to a highest number of nodes in the cluster among available nodes;

scheduling the first computing unit onto the first node and storing scheduler metadata comprising an application identifier, a pod identifier, and a node identifier indicating that the first computing unit is scheduled onto the first node;

subsequent to scheduling the first computing unit onto the first node, scheduling the second computing unit onto the second node instead of the third node in response to determining, based on the scheduler metadata, that the first computing unit and the second computing unit share the application identifier and that the first node, onto which the first computing unit is scheduled, is connected to the second node according to the connectivity matrix.

2. The method of claim 1, further comprising:

storing scheduler metadata that indicates that the first computing unit is scheduled onto the first node; and determining where the first computing unit is scheduled using the scheduler metadata when scheduling the second computing unit.

3. The method of claim 1, wherein scheduling the second computing unit to the second node further comprises determining that the second node is available for computation.

4. The method of claim 1, wherein scheduling the first computing unit onto the first node is in response to determining, based on the connectivity matrix, that the first node is a fully connected node.

5. The method of claim 1, wherein a fourth node of the plurality of nodes is a fully connected node, and wherein the first node is connected to a second most amount of nodes in the plurality of nodes, further comprising:

scheduling the first computing unit onto the first node in response to determining that the fourth node is unavailable for receiving assignments.

6. The method of claim 1, further comprising monitoring for changes in the interconnections using a link state protocol; and updating the connectivity matrix in response to detecting the changes.

7. The method of claim 1, wherein receiving the connection information comprises:

receiving individual connection information from each node of the plurality of nodes; and combining the individual connection information to form the connection information.

8. The method of claim 1, further comprising:

in response to determining that the second node is unavailable for receiving assignments and determining that the first node is available to receive additional assignments, scheduling the second computing unit onto the first node.

9. A system for connectivity-aware scheduling, comprising:

at least one memory;

at least one hardware processor coupled with the at least one memory and configured, individually or in combination, to:

execute, on each node of a plurality of nodes in a cluster, a connectivity monitoring overlay daemon that periodically pings other nodes in the cluster to determine connection status;

receive, from the connectivity monitoring overlay daemon on each node, individual connection information indicating which other nodes in the cluster responded to the pings;

generate a connectivity matrix by combining the individual connection information received from each node, wherein the connectivity matrix is a two-dimensional data structure in which rows and columns correspond to nodes, and wherein values in the matrix indicate whether a connection exists or no connection exists between corresponding nodes, and wherein the connectivity matrix indicates that, in the plurality of nodes, a first node is connected to a second node and is not connected to a third node;

identify a first computing unit and a second computing unit associated with an application, wherein the first computing unit and the second computing unit are pods comprising one or more containers with shared storage and network resources;

determine, based on the connectivity matrix, a number of nodes to which the first node is connected, and select the first node for scheduling the first computing unit in response to determining that the first node is connected to a highest number of nodes in the cluster among available nodes;

schedule the first computing unit onto the first node and store scheduler metadata comprising an application identifier, a pod identifier, and a node identifier indicating that the first computing unit is scheduled onto the first node;

subsequent to scheduling the first computing unit onto the first node, schedule the second computing unit onto the second node instead of the third node in response to determining, based on the scheduler metadata, that the first computing unit and the second computing unit share the application identifier and that the first node, onto which the first computing unit is scheduled, is connected to the second node according to the connectivity matrix.

10. The system of claim 9, wherein the at least one hardware processor is further configured to:

store scheduler metadata that indicates that the first computing unit is scheduled onto the first node; and determine where the first computing unit is scheduled using the scheduler metadata when scheduling the second computing unit.

11. The system of claim 9, wherein the at least one hardware processor is further configured to schedule the second computing unit to the second node by determining that the second node is available for computation.

12. The system of claim 9, wherein the at least one hardware processor is configured to schedule the first computing unit onto the first node in further response to determining, based on the connectivity matrix, that the first node is a fully connected node.

13. The system of claim 9, wherein a fourth node of the plurality of nodes is a fully connected node, and wherein the first node is connected to a second most amount of nodes in the plurality of nodes, wherein the at least one hardware processor is further configured to:

schedule the first computing unit onto the first node in response to determining that the fourth node is unavailable for receiving assignments.

14. The system of claim 9, wherein the at least one hardware processor is further configured to:

monitor for changes in the interconnections using a link state protocol; and update the connectivity matrix in response to detecting the changes.

15. The system of claim 9, wherein the at least one hardware processor is further configured to receive the connection information by:

receiving individual connection information from each node of the plurality of nodes; and combining the individual connection information to form the connection information.

16. The system of claim 9, wherein the at least one hardware processor is further configured to:

in response to determining that the second node is unavailable for receiving assignments and determining that the first node is available to receive additional assignments, schedule the second computing unit onto the first node.

17. A non-transitory computer readable medium storing thereon computer executable instructions for connectivity-aware scheduling, including instructions for:

executing, on each node of a plurality of nodes in a cluster, a connectivity monitoring overlay daemon that periodically pings other nodes in the cluster to determine connection status;

receiving, from the connectivity monitoring overlay daemon on each node, individual connection information indicating which other nodes in the cluster responded to the pings;

generating a connectivity matrix by combining the individual connection information received from each node, wherein the connectivity matrix is a two-dimensional data structure in which rows and columns correspond to nodes, and wherein values in the matrix indicate whether a connection exists or no connection exists between corresponding nodes, and wherein the connectivity matrix indicates that, in the plurality of nodes, a first node is connected to a second node and is not connected to a third node;

identifying a first computing unit and a second computing unit associated with an application, wherein the first computing unit and the second computing unit are pods comprising one or more containers with shared storage and network resources;

determining, based on the connectivity matrix, a number of nodes to which the first node is connected, and selecting the first node for scheduling the first computing unit in response to determining that the first node is connected to a highest number of nodes in the cluster among available nodes;

scheduling the first computing unit onto the first node and storing scheduler metadata comprising an application identifier, a pod identifier, and a node identifier indicating that the first computing unit is scheduled onto the first node;

subsequent to scheduling the first computing unit onto the first node, scheduling the second computing unit onto the second node instead of the third node in response to determining, based on the scheduler metadata, that the first computing unit and the second computing unit share the application identifier and that the first node, onto which the first computing unit is scheduled, is connected to the second node according to the connectivity matrix.

* * * * *